(12) United States Patent
Tsai

(10) Patent No.: US 6,445,650 B1
(45) Date of Patent: Sep. 3, 2002

(54) HIGH-SPEED DYNAMIC ACTUATING SYSTEM FOR OPTICAL DISKS

(75) Inventor: Chin-Shiong Tsai, TaiNan (TW)

(73) Assignee: Discovision Associates, Irvine, CA (US)

( * ) Notice: Subject to any disclaimer, the term of this patent is extended or adjusted under 35 U.S.C. 154(b) by 0 days.

(21) Appl. No.: 09/562,745

(22) Filed: May 2, 2000

(51) Int. Cl.[7] .............................................. G11B 7/085
(52) U.S. Cl. ..................................... 369/30.17; 369/215
(58) Field of Search .............................. 369/30.17, 30.1, 369/30.15, 30.14, 30.36, 215, 44.28, 44.27

(56) References Cited

U.S. PATENT DOCUMENTS

| | | | |
|---|---|---|---|
| 4,562,562 A | * 12/1985 | Moriya et al. | 369/32 |
| 4,740,939 A | * 4/1988 | Kimura et al. | 369/33 |
| 4,785,439 A | * 11/1988 | Okada et al. | 369/32 |
| 4,926,405 A | * 5/1990 | Hangai et al. | 369/32 |
| 5,175,716 A | * 12/1992 | Min | 369/44.11 |
| 5,563,856 A | * 10/1996 | Kim | 369/32 |
| 5,808,982 A | * 9/1998 | Yun | 369/44.28 |
| 6,064,633 A | * 5/2000 | Kuwayama et al. | 369/32 |
| 6,288,983 B1 | * 9/2001 | Jeong | 369/33 |

* cited by examiner

Primary Examiner—Tan Dinh
(74) Attorney, Agent, or Firm—Keiji Masaki; Steve Wong; Richard Stokey

(57) ABSTRACT

Disclosed is a high-speed dynamic actuating system for optical disks, particularly useful in an optical disk drive, wherein a closed-loop approach is used to overcome the diversity between devices and thus meet the requirement for high speed track-accessing and solve the problems in that the convention open-loop track-jumping takes a long period of time to perform segmental adjustment. The pick-up head is activated by applying high-speed dynamic actuation of the lens so as to conform to the pre-determined velocity curve and eliminate the wobble of the lens caused by different track-jumping times in an optical disk drive and a hard disk. In addition, said system can be implemented in an integrated circuit (IC), which is directly controlled by the hardware and thus effectively simplifies the complicated configuration as in the prior art.

12 Claims, 4 Drawing Sheets

HIGH-SPEED DYNAMIC ACTUATING SYSTEM FOR OPTICAL DISKS

BACKGROUND OF THE INVENTION

1. Field of the Invention

The present invention generally relates to a high-speed dynamic actuating system for optical disks, and more particularly, to an actuating system, wherein there is provided a closed-loop system together with a lens controller and a sledge controller so as to achieve high-speed track-jumping and thus improve the operation quality and reduce the fabrication cost.

2. Description of the Prior Art

Recently, due to the fast development in electro-optic technology, the related techniques of optical disk drives have grown rapidly and compatible with multimedia applications. In particular, CD-ROMs provide a great amount of data storage, and a new disc called DVD-ROM (digital video disk) provides considerably more data storage, reaching data storage capacities of up to 17 GB as compared to 680 MB for a CD-ROM. Such devices have especial usefulness in the storage of archiving data and in the storage of video data, such as full-length movies, and therefore have become the most widely used peripheral components not only in computer-based systems but also in Hi-Fi audio/video systems. At present, in the technical fields according to optical disk drives, it is crucial to fulfill precise track-accessing with a high speed. The convention open-loop track-jumping takes a long period of time to perform segmental adjustment. There exists a serious problem in that the diversity between devices can not be overcome. However, the present invention provides a closed-loop approach that can effectively solve the problem.

On the other hand, the pick-up head that an optical disk drive uses is different in configuration from that in a hard disk. Consequently, the track-jumping time in an optical disk drive differs from that in a hard disk. Moreover, the wobble of the lens is another problem that is difficult to prevent. It is thus the motive for the present invention to activate the pick-up head by using high-speed dynamic actuation of the lens so as to conform to the pre-determined velocity curve.

The commonly used techniques can be categorized into two groups, characterized respectively in (1) that only the input voltage FMO of the sledge motor is adjusted, and (2) that both the input voltage FMO of the sledge motor and the input voltage TRO of the pick-up head are adjusted, as described in detail as below.

(1) The group for which only the input voltage FMO of the sledge motor is adjusted can be further divided into sub-groups:

A. Velocity-oriented:

In an example with track-jumping number of six thousand (6,000), the voltage value of FMO and acceleration-to-deceleration ratio are adjusted so that the velocity is minimized as the tracking jumping number approaches 6,000. Therefore, the major disadvantages in this art are listed as below:
1) the fact of being unable to achieve the pre-determined track number due to the diversity between devices,
2) large variation of residual track number,
3) device collision as the track number counter is unidirectional, and
4) unstability due to the false estimation of velocity caused by the wobble of pick-up head.

B. Track-jumping number oriented:

The only difference from A is that the track-locking is performed after the pre-determined track number is achieved. However, the major disadvantages in this art are listed as below:
1) the fact of being unable to achieve stable track-locking due to the diversity between devices,
2) dependence of stability upon device quality.

The two methods fail to adjust all the track-jumping conditions with the same parameter, instead a segmental approach is used to perform adjustment. However, such an adjustment approach takes considerable time and programming space.

(2) The group for which both the input voltage FMO of the sledge motor and the input voltage TRO of the pick-up head are adjusted is described as below.

Due to the wobble of the pick-up head, the conventional method as proposed in (1) is unstable. The track-jumping method applied in later developed optical disk drives uses a closed-loop mechanism, characterized in adjusting both the input voltage FMO of the sledge motor and the input voltage TRO of the pick-up head, to eliminate the wobble of the lens.

The driving of the input voltage FMO of the sledge motor is similar to that in method (1). The wobbling signal (A+B−C−D) is received from the pick-up head and then is transmitted to the controller and finally the input voltage TRO of the pick-up head is output so as to restrain the wobble of the lens. The driving of FMO reaches more to the pre-determined destination as the damping of the lens is increased. However, the prerequisite is that the pick-up head provides each of the A, B, C and D output signals. Obviously, such method is not suitable for track-jumping with fewer tracks since it is hard to perform track-jumping with small track number even if the lens is completely fixed, only with the sledge motor being active. On the contrary, such method is relatively suitable for track-jumping with more tracks since the sledge motor dominates the whole mechanism while suffering from the problems of friction and narrow frequency band-width.

Furthermore, for a better understanding of the configuration of an optical disk drive, FIG. 1 is presented to illustrate the components interconnected in such device. Please refer to FIG. 1, in which the device comprises an optical disk 1 arranged on the top of an axis motor 2, which is the key component to rotate the disk 1; a pick-up head 3 arranged on a supporting means 4 and being able to moving back and forth on said supporting means 4; and a sledge motor 5 for driving said connected supporting means 4. As shown in FIG. 1, an input voltage TRO provided by said pick-up head 3 and an input voltage FMO provided by said sledge motor 5 are served as controlling signals.

SUMMARY OF THE INVENTION

Accordingly, it is a main object of the present invention to provide a high-speed dynamic actuating system for optical disks, particularly useful in an optical disk drive, wherein a closed-loop approach is used to overcome the diversity between devices and thus meet the requirement for high speed track-accessing and solve the problems in that the convention open-loop track-jumping takes a long period of time to perform segmental adjustment.

It is another object of the present invention to provide a high-speed dynamic actuating system for optical disks, wherein the pick-up head is activated by applying high-speed dynamic actuation of the lens so as to conform to the pre-determined velocity curve and eliminate the wobble of the lens caused by different track-jumping times in an optical disk drive and a hard disk.

Moreover, it is a further object of the present invention to provide a high-speed dynamic actuating system for optical disks, wherein said system can be implemented in an integrated circuit (IC), which is directly controlled by the hardware and thus effectively simplify the complicated configuration as in the prior art.

In order to accomplish the foregoing objects, the present invention relates to a high-speed dynamic actuating system for optical disks, with the high-speed dynamic actuation characteristics of the lens fitting to the pre-determined velocity curve, comprising a lens controller, connected to a pick-up head of an optical disk drive for controlling the relative velocity of the lens to said pick-up head; a sledge controller, connected to a sledge motor of an optical disk drive for controlling the relative velocity of said pick-up head to the ground.

The common function of said controllers is to control the relative velocity of the lens to the ground and the high-speed dynamic actuation characteristics of the lens fitting to the pre-determined velocity curve, with both the input of said lens controller and the input of said sledge controller receiving feedback signals from the output of said pick-up head through the feedback loop into both the inputs of said controllers, so as to form a closed feedback loop.

It is preferable that when said controllers perform track-jumping, the difference between the pre-determined velocity and the feedback velocity makes the output signal of said lens controller TRO function, enabling the feedback velocity to follow the pre-determined velocity immediately, and then said sledge controller functions, enabling the velocity of said pick-up head to follow the pre-determined velocity immediately, so as to, on the one hand, minimize the difference between the pre-determined velocity and the feedback velocity and, on the other hand, achieve stable track-jumping.

It is preferable that the feedback loop connects the output of said pick-up head to a track number counter for counting the number of the tracks and then connects said track number counter to both a velocity estimater and a velocity curve fitting circuit that are connected in parallel, with both the outputs of said velocity estimater and said velocity curve fitting circuit connected to perform calculation by a summing element, and then delivered to both the input of said lens controller and the input of said sledge controller, so as to form a closed feedback loop.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention relates to a high-speed dynamic actuating system for optical disks, particularly useful in an optical disk drive, wherein a closed-loop approach is used to overcome the diversity between devices and thus meet the requirement for high speed track-accessing and solve the problems in that the convention open-loop track-jumping takes a long period of time to perform segmental adjustment.

Figure 1:
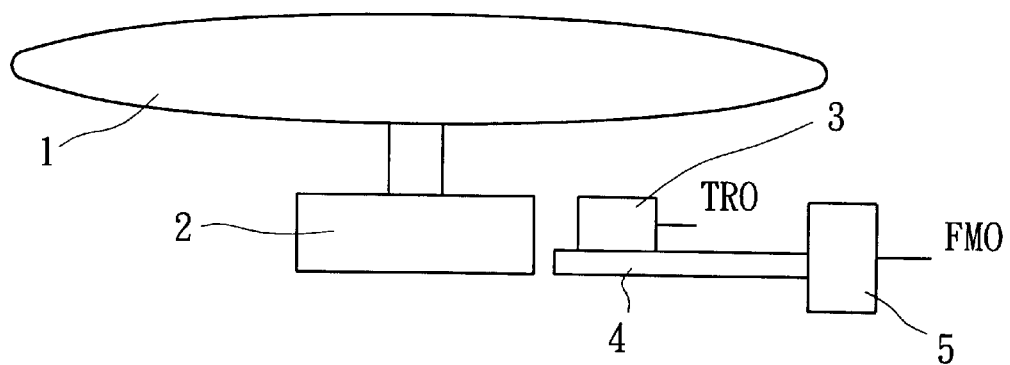
FIG. 1 is a configuration illustrating the components interconnected in an optical disk drive.
Figure 2:
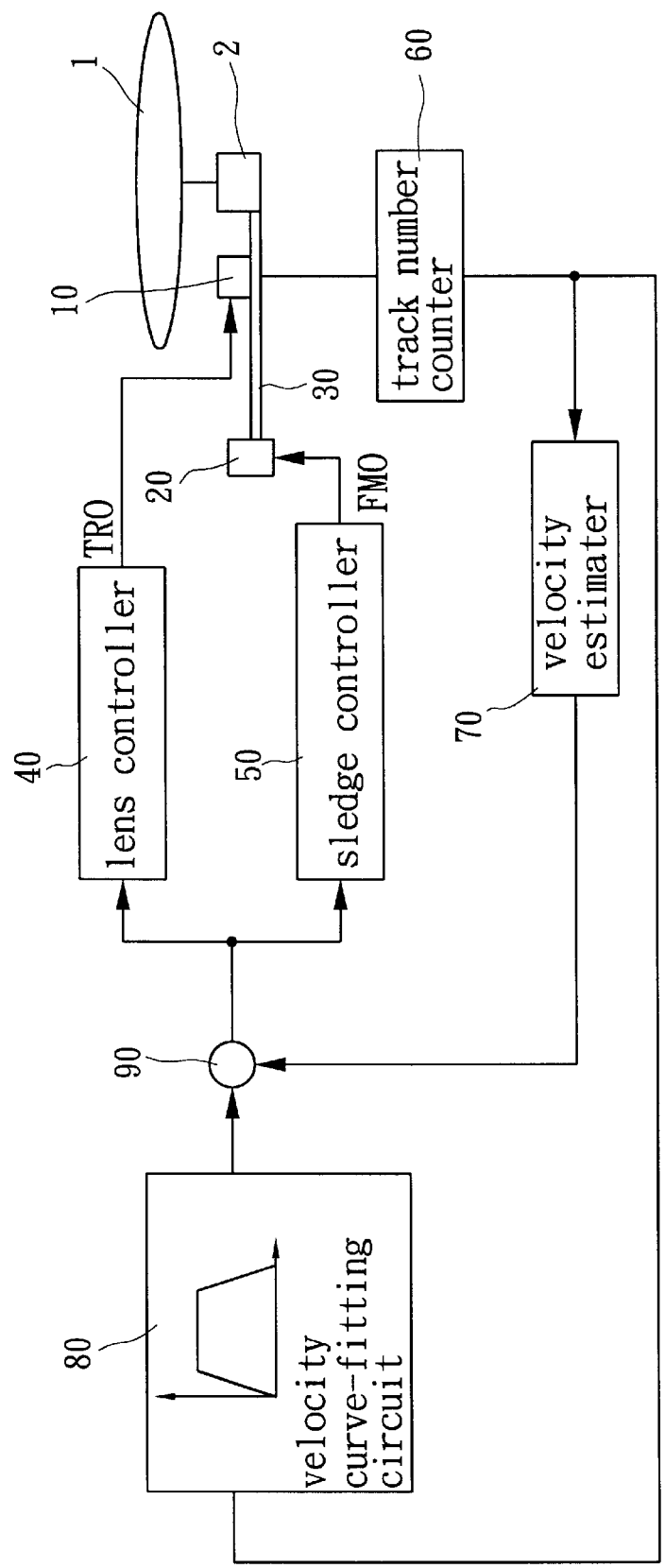
FIG. 2 is a block diagram illustrating the components interconnected in the high-speed dynamic actuating system for optical disks in accordance with the embodiment of the present invention.

The present invention provides a lens controller and a sledge controller together with a closed feedback loop, enabling the velocity of the pick-up head to follow the pre-determined velocity. Please refer to FIG. 2, which is a block diagram illustrating the components interconnected in the high-speed dynamic actuating system for optical disks according the present invention, comprising a lens controller 40, connected to a pick-up head 10 of an optical disk drive for controlling the relative velocity of the lens to said pick-up head 10; a sledge controller 50, connected to a sledge motor 20 of an optical disk drive for controlling the relative velocity of said pick-up head 10 to the ground. As shown in FIG. 2, there are also provided an optical disk 1, an axis motor 2, and a supporting means 30 that are identical to those used in the prior art as shown in FIG. 1.

The common function of said controllers 40, 50 is to control the relative velocity of the lens to the ground and the high-speed dynamic actuation characteristics of the lens fitting to the pre-determined velocity curve, with both the input of said lens controller 40 and the input of said sledge controller 50 receiving feedback signals from the output of said pick-up head 10 through the feedback loop into both the inputs of said controllers 40, 50, so as to form a closed feedback loop.

Moreover, the feedback loop connects the output of said pick-up head 10 to a track number counter 60 for counting the number of the tracks and then connects said track number counter 60 to both a velocity estimater 70 and a velocity curve fitting circuit 80 that are connected in parallel, with both the outputs of said velocity estimater 70 and said velocity curve fitting circuit 80 connected to perform calculation by a summing element 90, and then delivered to both the input of said lens controller 40 and the input of said sledge controller 50, so as to form a closed feedback loop.

When said controllers 40, 50, as shown in FIG. 2, perform track-jumping, the difference between the pre-determined velocity and the feedback velocity makes the output signal of said lens controller 40 TRO function, enabling the feedback velocity to follow the pre-determined velocity immediately, and then said sledge controller 50 functions, enabling the velocity of said pick-up head 10 to follow the pre-determined velocity immediately, so as to, on the one hand, minimize the difference between the pre-determined velocity and the feedback velocity and, on the other hand, achieve stable track-jumping.

In addition, according to the present invention, said lens controller 40 is implemented by using a first-order low-pass filter having the form $K_1*(z-a)/(z-b)$, and said sledge controller 50 is implemented by using a first-order low-pass filter having the form $K_2*(z-c)/(z-d)$. Please refer to FIG. 3, which is a control block diagram of the first-order low-pass filter in said lens controller 40 in accordance with the embodiment of the present invention, wherein an input u is coupled to a summing element 44 and then a first forward gain 45. The value of said first forward gain 45 is 1/z, and its output is coupled to a second forward gain 46 with a value of a. A feedback gain 47 with a value of b is coupled between the output of said first forward gain 45 and the input of said summing element 44. Then, the output of said second forward gain 46 is coupled to a summing element 49, meanwhile, both the outputs of said summing elements 44, 49 are directly interconnected. Finally, the output of said summing element 49 is coupled to an output gain 48 with a value of $K_1$. In such a manner, the form $K_1*(z-a)/(z-b)$ is obtained and the control block diagram of said lens controller 40 in accordance with the embodiment of the present invention is completed.

Figure 3:
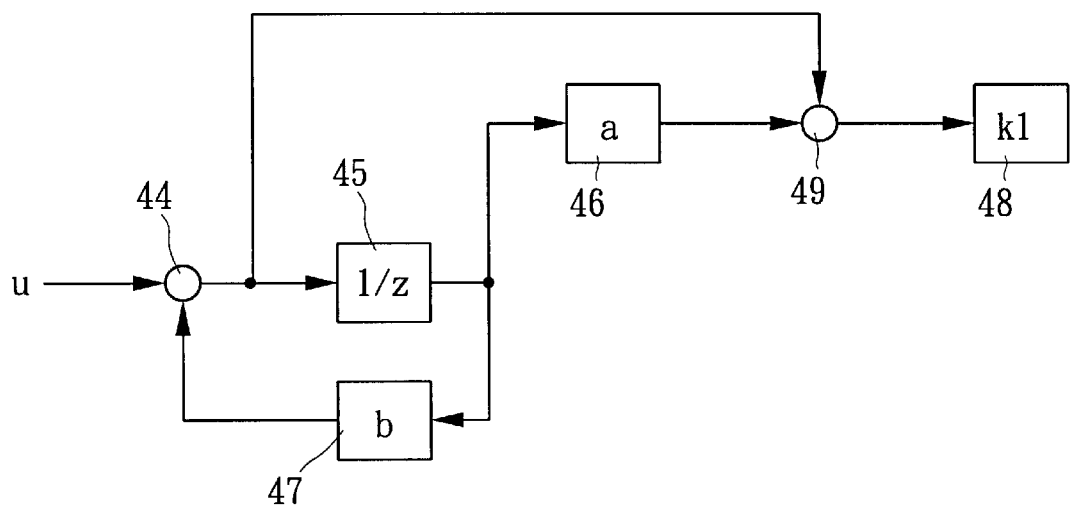
FIG. 3 is a control block diagram of the first-order low-pass filter in said lens controller in accordance with the embodiment of the present invention.
Figure 4:
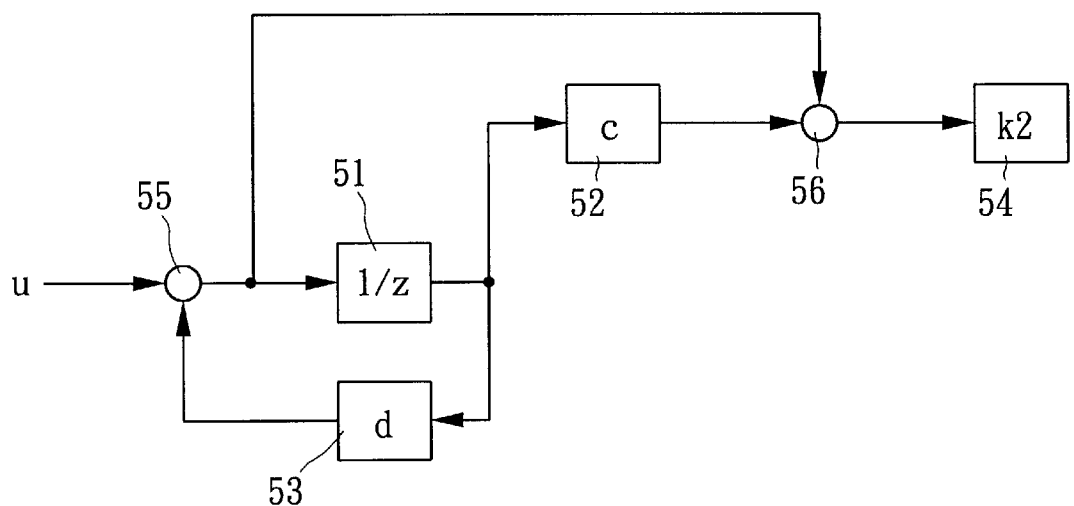
FIG. 4 is a control block diagram of the first-order low-pass filter in said sledge controller in accordance with the embodiment of the present invention.

Similar to FIG. 3, FIG. 4 is a control block diagram of the first-order low-pass filter in said sledge controller 50 in accordance with the embodiment of the present invention, wherein an input u is coupled to a summing element 55 and then a first forward gain 51. The value of said first forward gain 51 is 1/z, and its output is coupled to a second forward gain 52 with a value of c. A feedback gain 53 with a value of d is coupled between the output of said first forward gain 51 and the input of said summing element 55. Then, the output of said second forward gain 52 is coupled to a summing element 56, meanwhile, both the outputs of said summing elements 55, 56 are directly interconnected. Finally, the output of said summing element 56 is coupled to an output gain 54 with a value of $K_2$. In such a manner, the form $K_2*(z-c)/(z-d)$ is obtained and the control block diagram of said sledge controller 50 in accordance with the embodiment of the present invention is completed.

Figure 5:
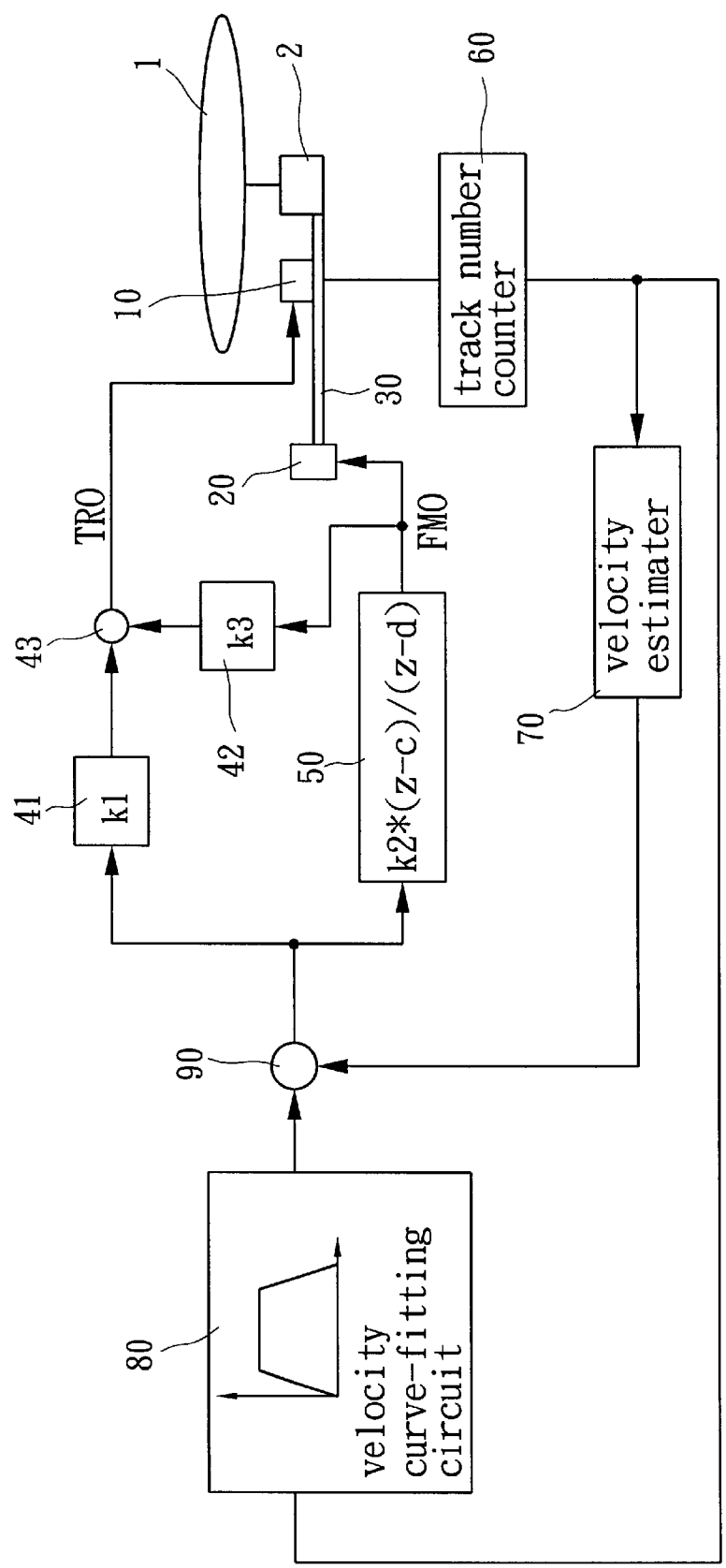
FIG. 5 is a block diagram illustrating the components interconnected in the high-speed dynamic actuating system for optical disks with a simplified lens controller in accordance with the embodiment of the present invention.

Taking the control forms of said lens controller 40 and said sledge controller 50 into account, as shown in FIG. 3 and FIG. 4, the lens will drift less from its center when the $K_2$-to-$K_1$ ratio is larger than ten. On the other hand, provided that, in the two control forms, b=d, said lens controller 40 can be simplified to be connected to a first gain, a second gain and a summing element 43, outputting a TRO signal. Please refer to FIG. 5, wherein said lens controller 40 can be simplified to have a first gain 41 with an input coupled to a summing element 90 and an output coupled to a summing element 43, the value of said first gain 41 being $K_1$; and a second gain 42, the value of said second gain 42 being $K_2$, connected between said sledge controller 50 and said summing element 43.

Accordingly, the present invention provides a lens controller 40 for controlling the relative velocity of the lens to said pick-up head 10 and a sledge controller 50 for controlling the relative velocity of said pick-up head 10 to the ground, wherein the common function of said controllers 40, 50 is to control the relative velocity of the lens to the ground and the high-speed dynamic actuation characteristics of the lens fitting to the pre-determined velocity curve.

On the other hand, since the dynamic response of the pick-up head is faster and the loop frequency band-width of the lens controller is wider, when said controllers perform track-jumping, the difference between the pre-determined velocity and the feedback velocity makes the output signal of said lens controller TRO function, enabling the feedback velocity to follow the pre-determined velocity immediately, and then said sledge controller functions, enabling the velocity of said pick-up head to follow the pre-determined velocity immediately, so as to, on the one hand, minimize the difference between the pre-determined velocity and the feedback velocity and, on the other hand, achieve stable track-jumping.

Therefore, it is a motive of the present invention to provide a high-speed dynamic actuating system for optical disks, wherein the pick-up head is activated by applying high-speed dynamic actuation of the lens so as to conform to the pre-determined velocity curve and eliminate the wobble of the lens caused by different track-jumping times in an optical disk drive and a hard disk. Moreover, the present invention can be implemented in an integrated circuit (IC), which is directly controlled by the hardware and thus effectively simplify the complicated configuration as in the prior art.

To sum up, the present invention is advantageous in 1) a simple structure that leads to reduced chip cost, 2) easiness to design the controller, and 3) stable and high-speed track-jumping. Proved by experimental results, the present invention can effectively eliminate the wobble of the lens, enabling the velocity of the lens to precisely fit the pre-determined velocity curve.

As discussed so far, in accordance with the present invention, there is provided a high-speed dynamic actuating system for optical disks, having a simple structure that leads to reduced chip cost, easiness to design the controller, and stable and high-speed track-jumping. Consequently, the present invention has been examined to be progressive and has great potential in commercial applications.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A high-speed dynamic actuating system for optical disks, with the high-speed dynamic actuation characteristics of the lens fitting to the pre-determined velocity curve, comprising:

a first gain and a second gain, coupled to a summing element, outputting a TRO signal to said pick-up head of an optical disk drive for controlling the relative velocity of the lens to said pick-up head;

a sledge controller, connected to a sledge motor of an optical disk drive for controlling the relative velocity of said pick-up head to the ground;

a track number counter, connected to the output of said pick-up head for counting the number of tracks;

a velocity estimater, connected to said track number counter for performing estimation of the velocity of said pick-up head; and a velocity curve fitting circuit, connected to said velocity estimater for fitting the velocity of said pick-up head to the pre-determined velocity curve; with both the outputs of said velocity estimater and said velocity curve fitting circuit connected to perform calculation by a summing element, and then delivered to both the input of said lens controller and the input of said sledge controller, so as to form a closed feedback loop.

2. The high-speed dynamic actuating system for optical disks as recited in claim 1, wherein when said controllers perform track-jumping, the difference between the pre-determined velocity and the feedback velocity makes the output signal of said lens controller TRO function, enabling the feedback velocity to follow the pre-determined velocity immediately, and then said sledge controller functions, enabling the velocity of said pick-up head to follow the pre-determined velocity immediately, so as to, on the one hand, minimize the difference between the pre-determined velocity and the feedback velocity and, on the other hand, achieve stable track-jumping.

3. The high-speed dynamic actuating system for optical disks as recited in claim 1, wherein said sledge controller is implemented by using a first-order low-pass filter having the form $K_2*(z-c)/(z-d)$, where $K_2$, c, d and z are gains.

4. A high-speed dynamic actuating system for optical disks, comprising:

an optical disk drive having a lens, a pick-up head and a sledge motor;

a lens controller connected to the pick-up head for controlling the relative velocity of the lens to the pick-up head, with the lens controller implemented by using a first-order low-pass filter having the form $K_1*(z-a)/(z-b)$;

a sledge controller connected to the sledge motor for controlling the relative velocity of the pick-up head to the ground; and wherein the lens controller and the sledge controller each has an input that receives feedback signals from an output of the pick-up head through to form a closed feedback;

where $K_1$, a, b and z are gains.

5. The system as recited in claim 4, wherein when the controllers perform track-jumping, the difference between the pre-determined velocity and the feedback velocity makes the output signal of the lens controller TRO function, enabling the feedback velocity to follow the pre-determined velocity immediately, and then the sledge controller functions, enabling the velocity of the pick-up head to follow the pre-determined velocity immediately, so as to, on the one hand, minimize the difference between the pre-determined velocity and the feedback velocity and, on the other hand, achieve stable track-jumping.

6. The system as recited in claim 4, wherein the feedback loop includes a track number counter coupled to the output of the pick-up head for counting the number of the tracks, with the track number counter connected to both a velocity estimater and a velocity curve fitting circuit that are connected in parallel, with the outputs of the velocity estimater and the velocity curve fitting circuit connected to a summing element, and with the output of the summing element delivered to both the input of the lens controller and the input of the sledge controller, so as to form the closed feedback loop.

7. The system as recited in claim 4, wherein said sledge controller is implemented by using a first-order low-pass filter having the form $K_2*(z-c)/(z-d)$, where $K_2$, c and d are gains.

8. The system as recited in claim 7, wherein the lens will drift less from its center when the $K_2$-to-$K_1$ ratio is larger than ten.

9. The system as recited in claim 7, wherein if b=d, the lens controller is simplified to be connected to a first gain, a second gain and a summing element, to output a TRO signal.

10. A high-speed dynamic actuating system for optical disks, comprising:

an optical disk drive having a lens, a pick-up head and a sledge motor;

a lens controller connected to the pick-up head for controlling the relative velocity of the lens to the pick-up head;

a sledge controller connected to the sledge motor for controlling the relative velocity of the pick-up head to the ground, with the sledge controller implemented by using a first-order low-pass filter having the form $K_2*(z-c)/(z-d)$; and wherein the lens controller and the sledge controller each has an input that receives feedback signals from an output of the pick-up head through to form a closed feedback;

wherein $K_2$, c, d and z are gains.

11. The system as recited in claim 10, wherein when the controllers perform track-jumping, the difference between the pre-determined velocity and the feedback velocity makes the output signal of the lens controller TRO function, enabling the feedback velocity to follow the pre-determined velocity immediately, and then the sledge controller functions, enabling the velocity of the pick-up head to follow the pre-determined velocity immediately, so as to, on the one hand, minimize the difference between the pre-determined velocity and the feedback velocity and, on the other hand, achieve stable track-jumping.

12. The system as recited in claim 10, wherein the feedback loop includes a track number counter coupled to the output of the pick-up head for counting the number of the tracks, with the track number counter connected to both a velocity estimater and a velocity curve fitting circuit that are connected in parallel, with the outputs of the velocity estimater and the velocity curve fitting circuit connected to a summing element, and with the output of the summing element delivered to both the input of the lens controller and the input of the sledge controller, so as to form the closed feedback loop.

\* \* \* \* \*